J. R. WHELEN.
FISH TRAP.
APPLICATION FILED JAN. 24, 1913.
1,167,732.
Patented Jan. 11, 1916.
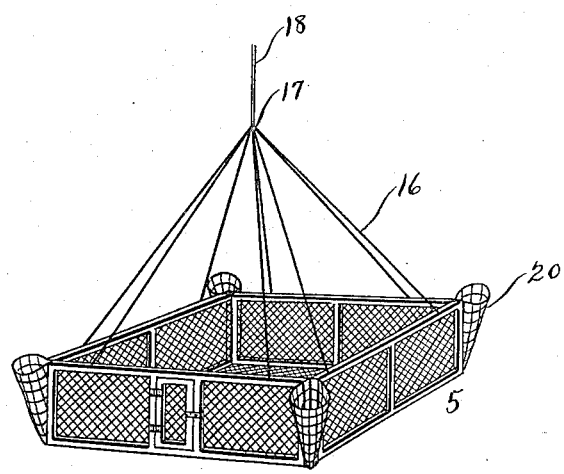
Fig. 1.
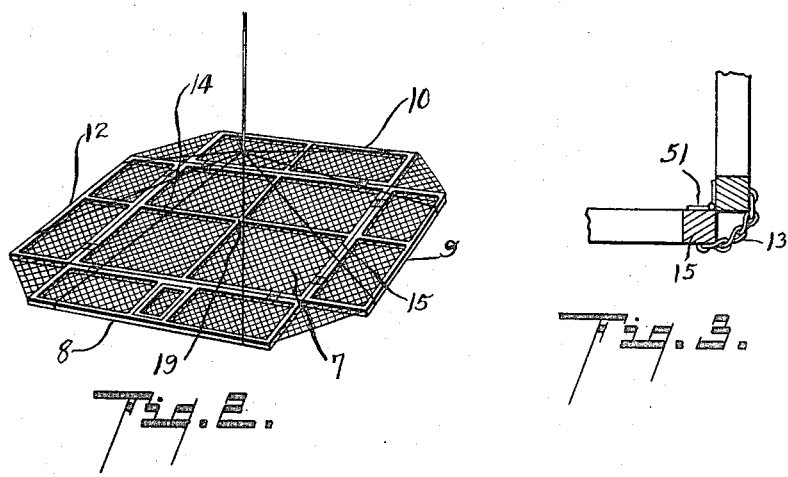
Fig. 2.
Fig. 3.
WITNESSES:
Chester E. Warner.
Thelma A. Kelly.
INVENTOR.
James R. Whelen
BY
Jno. G. Powell,
ATTORNEY.

UNITED STATES PATENT OFFICE.

JAMES R. WHELEN, OF DENVER, COLORADO.

FISH-TRAP.

1,167,732. Specification of Letters Patent. Patented Jan. 11, 1916.

Application filed January 24, 1913. Serial No. 743,964.

*To all whom it may concern:*

Be it known that I, JAMES R. WHELEN, a citizen of the United States, residing in the city and county of Denver, State of Colorado, have invented certain new and useful Improvements in Fish-Traps; and I do declare the following to be a full, clear, and exact description of my invention, such as will enable others skilled in the art to which it appertains to make and use the same, reference being had to the accompanying drawing, and to the figures of reference marked thereon, which form a part of this specification.

My invention relates to improvements in fish traps of the class adapted to be anchored in the water and removed therefrom at intervals, and has for its object the provision of a device of the class specified adapted to be actuated so quickly as to prevent the fish from escaping before the trap has reached the surface of the water.

Another object of the invention is to provide a trap of the class specified which when in the water occupies such a position that will not interfere or form an obstruction with the assembling of the fish in position to be trapped when the trap is removed from the water.

Another object of the invention resides in the simple arrangement and construction of parts and the positive and quick operation of the trap when the latter is actuated to be removed from the water.

In the use of my invention, many other objects and advantages embodied in the construction and arrangement will readily appear, and I wish it understood that all such objects and advantages are anticipated by me and within the spirit of my invention.

I will now proceed to describe my invention with reference to the accompanying drawing forming a part hereof.

In this drawing, Figure 1 is a perspective view of my trap; Fig. 2 is a similar view showing the parts in another position; and Fig. 3 is a detail view of the manner of hinging the sides of the trap.

Corresponding and like parts are referred to in the following description and indicated in all the views of the accompanying drawing by the same reference characters.

Let the numeral 5 represent my fish trap which is adapted to be anchored in the water. The trap 5 consists of a bottom member 7, having side members 8, 9, 10 and 12 hinged to the edges thereof by means of hinges 51' and chains 13. The member 7 is composed of intersecting metal bars 14, which connect at their extremities with a rectangular frame 15, which is also composed of metal. Relatively coarse mesh wire is stretched over the member 7 and forms an obstruction against the escape of the fish through the member 7, the intersecting bars 14 and frame 15 serving to support the mesh wire on said member 7, the said mesh wire being secured to the said intersecting bars 14 and frame 15. The side members 8, 9, 10 and 12 are also each formed of a metal frame-work over which wires are stretched to sufficiently close the said side members to prevent the escape of marketable size fish. All of the side members are connected by means of wire cables 16, which intersect at 17, a hoisting cable 18 being connected with said wire cables 16 at their intersecting point 17, and by virtue of which the trap may be hoisted from the water, in a manner which will be later explained. The sides 8, 9, 10 and 12 are adapted to lie flat and parallel with the bottom member 7 when the trap 5 is anchored in the water, whereby the fish are not obstructed from assembling upon the said trap 5 to obtain a bait which is adapted to be secured in the center of the member 7, to a fastening device 19. The cables 16 are normally sufficiently slack to permit the said sides 8, 9, 10 and 12 to fall outwardly and lie flat with the member 7, but when the hoisting cable 18 is drawn upwardly, the cables 16 are caused to draw the side members up to a position at right angles with the bottom member 7 and form a box in which the fish may be raised out of the water. All of the said side members are connected at their extremities by means of netting 20, which serves as a preventive against the escape of the fish at the corners of the trap 5, during the time that the side members are being raised to their upright positions. This netting 20, with which the extremities of said members are connected, readily permits of the said side members being raised to their upright positions, since the same is formed of cord and is therefore not rigid.

The side members 8, 9, 10 and 12, of the trap 5, are also hinged to the bottom member 7, by means of hinges 51', in addition to the chains 13. These side members 8, 9, 10 and 12, when in the raised position, normally occupy a slightly outwardly inclined position, whereby when said part 5 is anchored in the water, the said side members will fall downward or to the open position under the influence of gravity.

While I have described and illustrated herein a specific form of my invention, it is understood that I am not limited thereto in making and using the invention, but that the same may be modified and varied without departing from the spirit of my invention or the scope of the appended claims.

Having thus described my invention what I claim and desire to secure by Letters Patent is:

1. A fish trap, adapted to be anchored in the water, said trap consisting of a bottom member, side members adapted to occupy the down position when said trap is anchored in the water, rigid hinges connecting the inner sides of said side members with the upper side of said bottom member, chains arranged at right angles to the axis upon which said side members operate and connecting the outer sides of said side members with the under side of said bottom member, netting connecting the extremities of said side members, and means connected with said side members adapted to cause the latter to assume the raised position and lift the said trap out of the water.

2. A trap, comprising a bottom member, side members adapted to occupy the down position when said trap is set, rigid hinges connecting the inner sides of said side members with the upper side of said bottom member, chains arranged at right angles to the axis upon which said side members operate and connecting the outer sides of said side members with the under side of said bottom member, and means connected with said side members adapted to cause the latter to assume the raised position.

In testimony whereof I affix my signature hereto in the presence of two witnesses.

JAMES R. WHELEN.

Witnesses:
   JNO. G. POWELL,
   FLORENCE A. KILCOURSE.

Copies of this patent may be obtained for five cents each, by addressing the "Commissioner of Patents, Washington, D. C."